United States Patent
Ichiba et al.

[11] Patent Number: 5,826,865
[45] Date of Patent: Oct. 27, 1998

[54] FRONT WHEEL STABILIZER FOR FOUR WHEEL DRIVE VEHICLE

[75] Inventors: Junso Ichiba, Sagamihara; Yoshiaki Yoshimoto, Atsugi, both of Japan

[73] Assignee: Nissan Motor Co., Ltd., Kanagawa, Japan

[21] Appl. No.: 895,563

[22] Filed: Jul. 16, 1997

[30] Foreign Application Priority Data

Jul. 16, 1996 [JP] Japan ................................. 8-186262

[51] Int. Cl.⁶ ............................. B60G 21/04; B62D 9/02
[52] U.S. Cl. ........................................ 267/188; 280/689
[58] Field of Search .................................. 280/688, 689, 280/695, 700, 710, 717, 721, 723, 772; 267/188, 273, 278

[56] References Cited

U.S. PATENT DOCUMENTS 3,540,714  11/1970  Mueller ................................... 267/188
5,511,817  4/1996  Kasahara et al. ....................... 280/688

FOREIGN PATENT DOCUMENTS 0039507  3/1983  Japan .................................... 280/689

OTHER PUBLICATIONS

"Introduction To The New Capella" Matsuda Corporation Co., Ltd. Jul. 1994.

Primary Examiner—Robert J. Oberleitner
Assistant Examiner—Chris Schwartz
Attorney, Agent, or Firm—McDermott, Will & Emery

[57] ABSTRACT

Front wheel suspension arms of a four wheel drive vehicle are supported by suspension members comprising a cross-member and front/back members formed at the ends of the cross-member. A transfer for distributing engine drive torque to the rear wheels is disposed underneath the cross-member. A stabilizer joining the left and right suspension arms is disposed such that it horizontally passes under the transfer at the front of the cross-member. Since the stabilizer is not disposed at the rear of or above the cross-member where it would tend to interfere with the vehicle body, the cross-sectional area of the cross-member may easily be made sufficiently large. Also, by positioning the stabilizer at the front of the cross-member, the length of the arms at both ends of the stabilizer can be made shorter, and desirable roll stability characteristics are obtained.

4 Claims, 2 Drawing Sheets

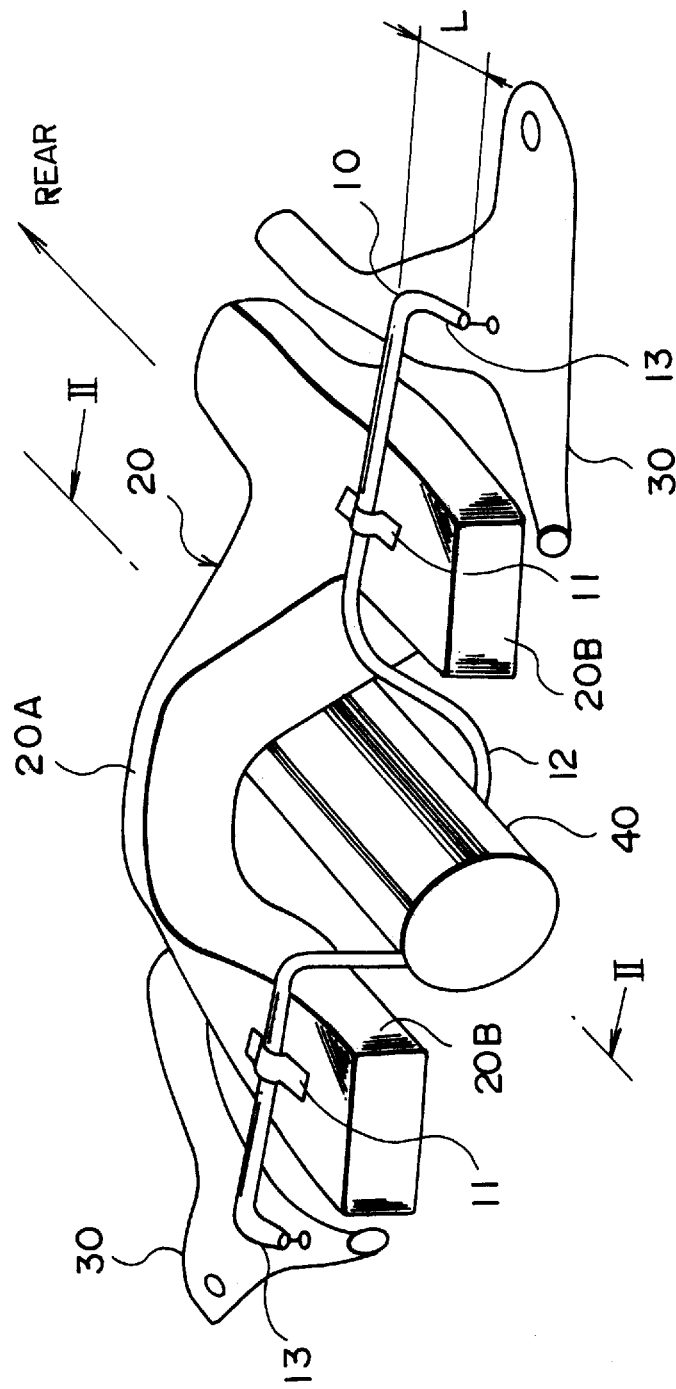
F I G. 1

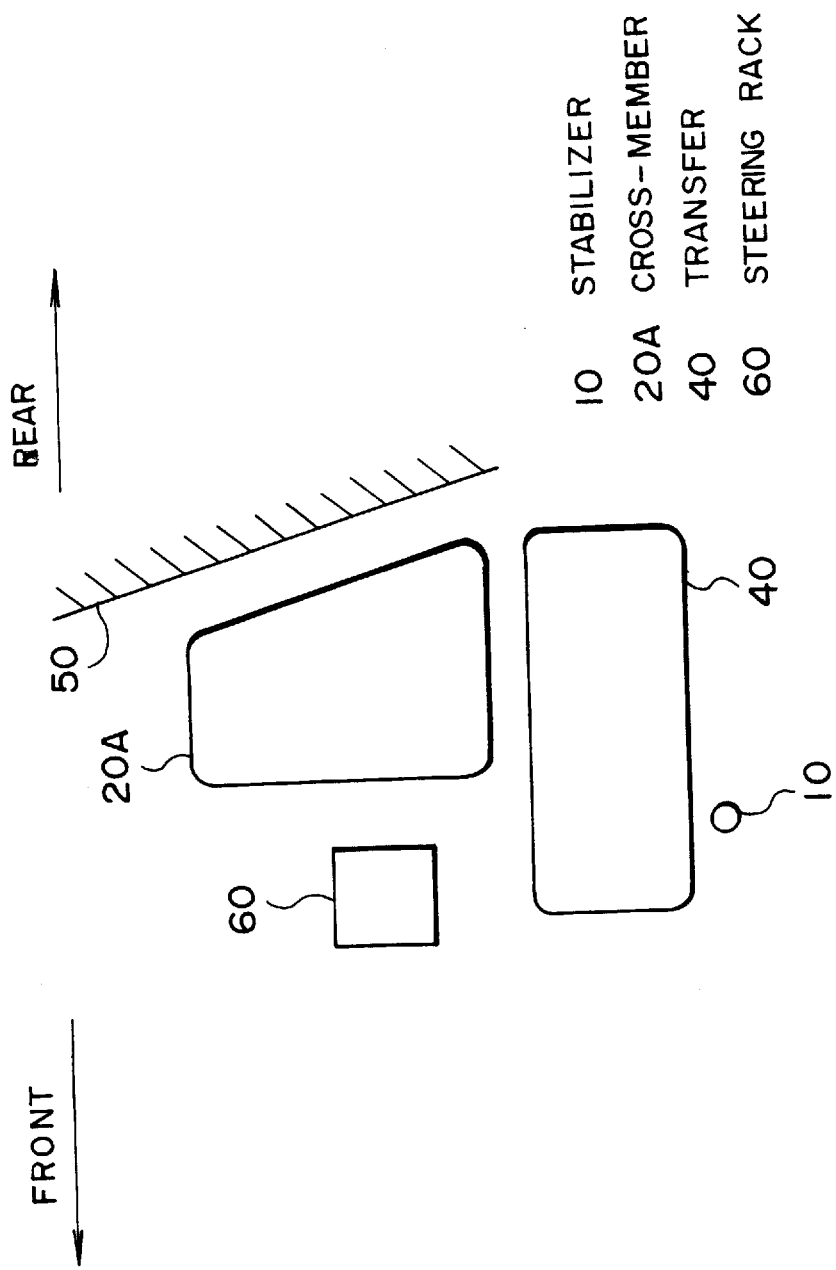

FRONT WHEEL STABILIZER FOR FOUR WHEEL DRIVE VEHICLE

FIELD OF THE INVENTION

This invention relates to the application of a stabilizer for suppressing lean of a vehicle in the direction of roll.

BACKGROUND OF THE INVENTION

Vehicle stabilizers resist the reverse phase action of right and left suspension arms, and thereby suppress lean of the vehicle in the direction of roll.

A front wheel stabilizer of this type is for example proposed in "Introduction to the New CAPELLA" by Matsuda Corporation Co., Ltd. in July, 1994.

According to this reference, suspension arms are supported by a vehicle body via a suspension member, and a stabilizer connects these suspension arms.

The suspension member comprises a cross-member extending in a transverse direction to the vehicle body and a pair of front/back members extending in a front/back direction from both ends of the cross-member.

A stabilizer is disposed at the rear of the cross-member, both of its ends being bent toward the front in the shape of an arm.

The ends of the arm are connected to the suspension arms.

In a four wheel drive vehicle, a transfer which is a gear mechanism for transmitting engine power to the rear wheels is disposed directly underneath the cross-member, so the stabilizer horizontally passes over the transfer.

In general, the cross-member is disposed close to the vehicle body and there is little room between the rear or upper surface of the cross-member and the vehicle body.

Therefore if the stabilizer is arranged as described hereabove, a space for the arrangement of the stabilizer between the cross-member and the vehicle body must be ensured. As a result, there is no room for increasing the cross-sectional area of the cross-member which may be a serious limitation on the structural design of the vehicle.

Moreover when the stabilizer is disposed behind the cross-member, the arm part must be lengthened so that the distance in a front/back direction between the suspension arms and the stabilizer increases, and this has an undesirable effect on the dynamic characteristics of the stabilizer.

SUMMARY OF THE INVENTION

It is therefore an object of this invention to prevent interference between a stabilizer and a transfer, and to remove the limitation of the cross-sectional area of a cross-member by the stabilizer.

It is a further object of this invention to improve the dynamic characteristics of the stabilizer.

In order to achieve the above objects, this invention provides a stabilizer for connecting right and left suspension arms supporting front wheels of a four wheel drive vehicle. The suspension arms are supported by a cross-member and a pair of front and back members joined to both ends of the cross-member. A transfer for distributing engine drive torque is disposed underneath the cross-member.

The stabilizer comprises a middle portion passing underneath the transfer at the front of the cross-member.

This middle portion preferably comprises a crank-shaped bend which makes a detour around the transfer.

The details as well as other features and advantages of this invention are set forth in the remainder of the specification and are shown in the accompanying drawings.

BRIEF DESCRIPTION OF THE DRAWINGS

FIG. 1 is a perspective view of a front wheel support part of a four wheel drive vehicle showing a stabilizer according to this invention.

FIG. 2 is a view in horizontal cross-section of the front wheel support part taken along a line II—II in FIG. 1.

DESCRIPTION OF THE PREFERRED EMBODIMENTS

Referring to FIG. 1 of the drawings, a pair of left and right suspension arms 30 support right and left front wheels of a four wheel drive vehicle, not shown.

These suspension arms 30 are supported by a vehicle body via a suspension member 20.

The suspension member 20 comprises a cross-member 20A extending in a horizontal direction transverse to the vehicle body, and a pair of front/back members 20B extending in a front/back direction from both ends of the cross-member 20A.

A transfer 40 is disposed directly beneath the central part of the cross-member 20A. The transfer 40 is a housing, such as a gear box, that includes a gear mechanism, such as a drive torque transmitting member, that is used for distributing the drive torque of an engine to the rear wheels.

The suspension arms 30 are connected by a stabilizer 10. The stabilizer 10 comprises arm pieces 13 bent in an L shape at both ends.

The stabilizer 10 is disposed at the front of the cross-member 20A, and it makes a detour underneath the transfer 40. A crank-shaped bend 12 is therefore formed in its middle portion.

On either side of this bend 12, the stabilizer 10 passes over the right and left front/back members 20B, the ends of the right and left arm pieces 13 being joined to the suspension arms 30. The stabilizer 10 is fitted to the right and left front/back members 20B via a bracket 11 such that its torsional movement is allowed.

As shown in FIG. 2, a steering rack 60 for steering the vehicle is disposed above the transfer 40.

If it is attempted to move the left and right front wheels in reverse phase when cornering the vehicle, the stabilizer 10 is twisted, and its elastic restoring force opposes the reverse phase motion of the left/right wheels. In this way, the lean of the vehicle in the direction of roll is suppressed.

As the stabilizer 10 is disposed at the front of the cross-member 20A, the length L of the arm piece 13 is small, and the elastic restoring force of the stabilizer 10 in suppressing the reverse phase motion of the vehicle can be used effectively.

Moreover as the stabilizer 10 passes underneath the transfer 40, there is no need to leave space for the stabilizer 10 between the cross-member 20A and the vehicle body 50, so the cross-member 20A may be given a sufficiently large cross-sectional area. The stabilizer 10 which passes underneath the transfer 40 also does not interfere with the steering rack 60, so the steering rack 60 may be disposed close to the suspension member 20.

It is intended that the protection granted hereon be limited only by the definition contained in the appended claims and equivalents thereof.

We claim:

1. A stabilizer for connecting first and second suspension arms supporting first and second wheels of a vehicle, the suspension arms being supported by a cross-member and a pair of front and back members joined to both ends of the cross-member and a transfer for distributing engine drive torque being disposed underneath the cross-member, said stabilizer comprising:

a member having a middle portion for passing underneath the transfer.

2. A stabilizer as defined in claim 1, wherein said middle portion comprises a crank-shaped bend that is adapted to extend under the transfer.

3. A suspension system for a vehicle having a transfer, said suspension system comprising:

a first suspension arm supporting a first wheel;

a second suspension arm supporting a second wheel;

a cross-member supporting said first suspension arm and said second suspension arm, the transfer being disposed underneath said cross-member; and a stabilizer connecting said first suspension arm to said second suspension arm, said stabilizer having a middle portion passing underneath the transfer.

4. A stabilizer for use with a suspension system for a vehicle having a transfer, the suspension system including a first suspension arm supporting a first wheel, a second suspension arm supporting a second wheel, and a cross-member supporting the first suspension arm and the second suspension arm, the transfer being disposed underneath the cross-member, said stabilizer comprising:

a member having a first end for connection to the first suspension arm and a second end for connection to the second suspension arm, said member having a middle portion for passing underneath the transfer.

* * * * *